United States Patent
Kobatake

(10) Patent No.: US 9,792,559 B2
(45) Date of Patent: Oct. 17, 2017

(54) SWITCHING SYSTEM, LINE CARD, SWITCH CARD, FDB LEARNING METHOD, FDB LEARNING ARBITRATION METHOD AND PROGRAM

(71) Applicant: NEC Corporation, Tokyo (JP)

(72) Inventor: Yoshiharu Kobatake, Tokyo (JP)

(73) Assignee: NEC CORPORATION, Tokyo (JP)

( * ) Notice: Subject to any disclaimer, the term of this patent is extended or adjusted under 35 U.S.C. 154(b) by 416 days.

(21) Appl. No.: 14/404,642

(22) PCT Filed: May 31, 2013

(86) PCT No.: PCT/JP2013/065245
§ 371 (c)(1),
(2) Date: Dec. 1, 2014

(87) PCT Pub. No.: WO2013/180287
PCT Pub. Date: Dec. 5, 2013

(65) Prior Publication Data
US 2015/0120622 A1    Apr. 30, 2015

(30) Foreign Application Priority Data
Jun. 1, 2012  (JP) ................................ 2012-126233

(51) Int. Cl.
G06N 99/00    (2010.01)
G06N 5/02     (2006.01)
H04L 12/741   (2013.01)

(52) U.S. Cl.
CPC ........... G06N 99/005 (2013.01); G06N 5/027 (2013.01); H04L 45/54 (2013.01)

(58) Field of Classification Search
None
See application file for complete search history.

(56) References Cited

U.S. PATENT DOCUMENTS

| | | | | |
|---|---|---|---|---|
| 2007/0268915 A1* | 11/2007 | Zelig | ................... | H04L 12/4625 370/401 |
| 2008/0049764 A1* | 2/2008 | Solomon | ................. | H04L 12/66 370/401 |
| 2010/0189119 A1* | 7/2010 | Sawada | ................. | H04L 45/021 370/401 |

FOREIGN PATENT DOCUMENTS

| | | |
|---|---|---|
| JP | 2006-237801 | 9/2006 |
| JP | 2010-177722 | 8/2010 |
| JP | 2011-091477 | 5/2011 |

OTHER PUBLICATIONS

International Search Report PCT/JP2013/065245 dated Jul. 30, 2013.

* cited by examiner

*Primary Examiner* — Hong Cho
(74) *Attorney, Agent, or Firm* — Young & Thompson

(57) ABSTRACT

A switching system includes a plural of line and a switch card. The line card or cards notifies the out whether or not the line card or line cards is in the FDB learning enabled state. The switch card includes a learning information storage unit that holds in store the FDB learning information received from the multiple line cards and an FDB learning arbitration unit that, when all of the line cards are in an FDB leaning enabled state, selects and sends the FDB learning information, stored in the learning information storage unit, to the respective line cards, based on a notification from each the line cards.

14 Claims, 11 Drawing Sheets

FIG. 2

| MAC ADDRESS | LINE NUMBER |
|---|---|
| 00:00:00:00:0A:00 | #1 |
| ⋮ | ⋮ |

SWITCHING SYSTEM, LINE CARD, SWITCH CARD, FDB LEARNING METHOD, FDB LEARNING ARBITRATION METHOD AND PROGRAM

TECHNICAL FIELD

Reference to Related Application

This application is based upon and claims the benefit of the priority of Japanese Patent Application No. 2012-126233 filed on Jun. 1, 2012, the disclosure of which is incorporated herein in its entirety by reference thereto.

The present invention relates to a switching system, a line card, a switch card, an FDB learning method, an FDB learning arbitration method and a program. More particularly, it relates to a switching system, a line card, a switch card, an FDB learning method, an FDB learning arbitration method and a program in which there are provided a plurality of forwarding databases, referred to below as FDBs.

BACKGROUND

In Patent Literature 1, there is disclosed a switch device including a plurality of line cards (cards A and C in Patent Literature 1), each equipped with an FDB, and also including a second card. The second card includes a management unit that collects the FDB information (FDB learning information) from the line cards to return the so collected information to the line cards.

In the system of the switch device of Patent Literature 1, there are cases wherein a frame containing the FDB information (FDB learning information) is dropped due to the band limiting function innate to the device. Thus, in Patent Literature 2, a transmission rate limiter circuit is equipped on each line card to enable the FDBs to be synchronized positively with one another.

PATENT LITERATURE (PTL)

[Patent Literature 1]
Japanese Patent Kokai Publication No. JP2010-177722A
[Patent Literature 2]
Japanese Patent Kokai Publication No. JP2011-91477A

SUMMARY

The following analysis given by the present invention. In the transmission rate control circuit of Patent Literature 2, such a time interval during which learning frames are wilfully not sent (a rate limiting time interval) is provided in a counter so as to control the transmission rate of learning frames (see FIG. 7; paragraph 0054). If it is presupposed that no frames are dropped, and an N-number of line cards are in circuit, the transmission rate is (1/(N−1)×100%, thus correspondingly increasing the time as set in the counter (see paragraph 68). This raises a problem that, even if there is allowance in the bandwidth in the relaying path, only a worst case number of times of the FDB learning may be carried out. If ten line cards are connected to the switch having slots for the ten line cards, the transmission rate is ca. 11.1%, according to the above formula, thus appreciably slowing down the FDB learning rate per unit time.

It is therefore an object of the present invention to provide a switching system, a line card, a switch card, an FDB learning method, an FDB learning arbitration method and a program, according to which FDB learning may be performed without missing FDB learning frames.

According to a first aspect, there is provided a switching system includes a plurality of line cards and a switch card. Each of the line cards has a forwarding database, abbreviated below to 'FDB', an FDB search unit and an FDB learning unit. The FDB search unit searches the FDB for an entry matched to a frame received to make a decision on whether or not FDB learning is necessary. The FDB search unit sends FDB learning information to the switch card in case a decision is made that FDB learning is necessary. The FDB learning unit registers the FDB learning information received from the switch card in the FDB. The line cards notify the switch card about whether or not the line cards are in the FDB learning enabled state. The switch card has a learning information buffer that holds in store the FDB learning information received from the plurality of the line cards, and an FDB learning arbitration unit. The FDB learning arbitration unit selectively sends the FDB learning information stored in the learning information buffer to the line cards if, based on a notification from each of the line cards, the total of the line cards are in the FDB learning enabled state.

According to a second aspect, there is provided a line card(s) is connected to a switch card including a learning information buffer that holds in store FDB learning information received from the line card(s), and an FDB learning arbitration unit. The FDB learning arbitration unit sends the FDB learning information stored to the line card(s) if, based on a notification from each of the line cards, the total of the line cards are in the FDB learning enabled state. The line card(s) includes an FDB search unit and an FDB learning unit. The FDB search unit searches the FDB for an entry matched to a frame received to make a decision on whether or not FDB learning is necessary. The FDB search unit sends the FDB learning information to the switch card in case the decision is made that FDB learning is necessary. The FDB learning unit registers the FDB learning information received from the switch card in the FDB. The line card(s) notifies the switch card about whether or not the line card(s) is in the FDB learning enabled state.

According to a third aspect, there is provided a switch card includes a learning information buffer that holds in store FDB learning information received from a plurality of line cards, and an FDB learning arbitration unit, which FDB learning arbitration unit sends the FDB learning information stored to each of the line cards if, based on a notification from each of the line cards, the total of the line cards are in the FDB learning enabled state.

According to a fourth aspect, there is provided a method for learning the FDB information includes a line card(s) connected to a switch card including an FDB learning information buffer and an FDB learning arbitration unit; the FDB learning information buffer holding in store the FDB learning information received from the line card(s); the FDB learning arbitration unit sending the FDB learning information stored to each of the line card (s) if, based on a notification from each of the line cards, the total of the line cards are in the FDB learning enabled state;

searching an FDB (forwarding database) for an entry matched to a frame received to make a decision on whether or not FDB learning is necessary;

sending the FDB learning information to the switch card in case the decision is made that FDB learning is necessary; and registering the FDB learning information received from the switch card in the FDB when the total of the line cards in the FDB learning enabled state.

The present method is bound up with a particular device which is a line card that performs FDB learning.

According to a fifth aspect, there s provided a method for arbitrating FDB learning includes a switch card connected to a plurality of line cards each including an FDB search unit and an FDB learning unit; the FDB search unit searching an FDB (forwarding database) for an entry matched to a frame received to make a decision on whether or not FDB learning is necessary; the FDB search unit sending the FDB learning information to the switch card in case the decision is made that FDB learning is necessary; the FDB learning unit registering the FDB learning information received from the switch card in the FDB; the line card(s) notifying the switch card about whether or not the line card(s) is in the FDB learning enabled state;

storing the FDB learning information received from the line card(s); and sending the FDB learning information stored to each of the line cards if, based on a notification from each of the line cards, the total of the line cards are in the FDB learning enabled state. The present method is bound up with a particular device which is a switch card that sends the FDB learning information to the line card.

According to a sixth aspect, there is provided a computer program is run on a computer that is provided on board the above mentioned line card or switch card. It is noted that the present program can be recorded on a computer-readable, that is, non-transient, recording medium. That is the present invention may be implemented as a computer program product.

The meritorious effects of the present invention are summarized as follows.

According to the present disclosure, FDB learning can be carried out at a high speed without missing FDB learning frames.

BRIEF DESCRIPTION OF THE DRAWINGS

FIG. 2 is a tabulated view showing a schematic configuration of a forwarding database (FDB).

PREFERRED MODE

A summary of a preferred mode of the present disclosure will now be described with reference to the drawings. It is noted that symbols entered in the following summary are attached to respective associated elements merely as examples to assist in understanding and re not intended to limit the present disclosure to the mode illustrated.

Figure 1:
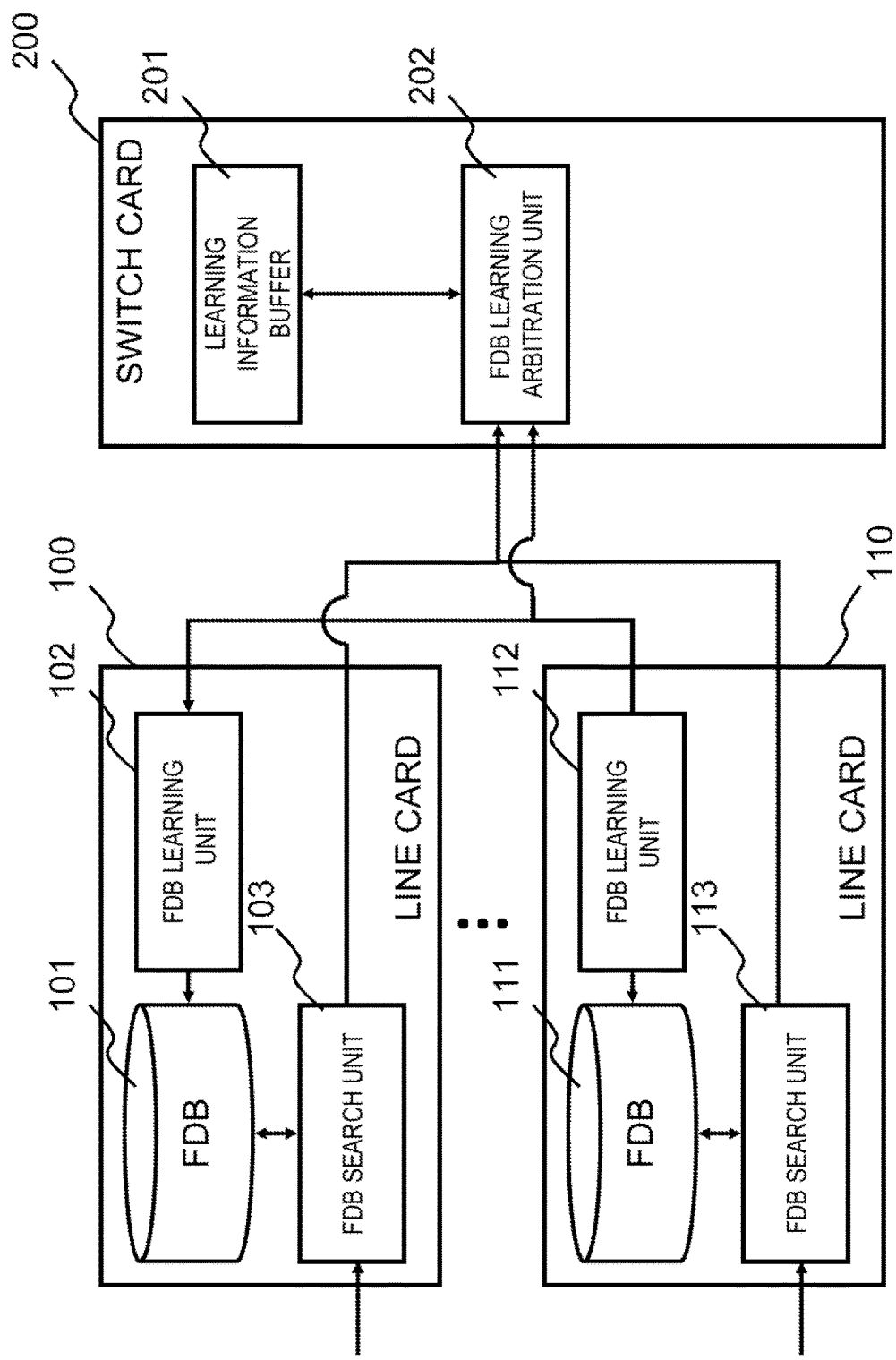
FIG. 1 is a schematic view showing a configuration of a first exemplary embodiment of the present disclosure.

The present disclosure may be implemented, in its preferred mode, by a configuration comprised of a switch card 200 and a plurality of line cards 100, 110, connected thereto, as shown in FIG. 1. More specifically, each of the line cards 100 (110) includes an FDB(s) 101 (111), an FDB search unit(s) 103 (113) and an FDB learning unit(s) 102 (112). The FDB search unit(s) searches the FDB(s) 101 (111) for an entry matched to a frame received to decide whether or not FDB learning is necessary. If the FDB learning is found to be necessary, the FDB search unit(s) sends the FDB learning information to a switch card 200. The FDB learning unit(s) 102 (112) registers the FDB learning information, received from the switch card 200, in the FDB(s) 101 (111). In addition, the line cards 100, 110 notify the switch card 200 about whether or not the on devices (line cards) are in the FDB learning enabled state.

The switch card 200 includes a learning information buffer 201 that holds in store the FDB learning information received from the line card(s) 100, 110, and an FDB learning arbitration unit 202. The FDB learning arbitration unit selects and sends the FDB learning information, stored in the learning information buffer 201, to the line card(s) 100, 110 if, based on a notification from the line card(s) 100, 110, the total of the line cards are in the FDB learning enabled state.

By the above configuration, the FDB learning information may be sent to the respective line cards in case the total of the line cards are in the FDB learning enabled state. Thus, FDB learning may be performed positively during the period of low load on the respective line cards. In addition, missing the FDB learning frames may be avoided inasmuch as the learning information is stored in the learning information buffer 201.

First Exemplary Embodiment

A first exemplary embodiment of the present disclosure will now be described in detail with reference to the drawings. FIG. 1 depicts a configuration of a switching system of the first exemplary embodiment of the present disclosure. Specifically, FIG. 1 depicts a configuration in which a plurality of line cards 100, 110 are connected to a switch card 200. In the explanation to follow, it is assumed that four line cards are connected to a single switch card and that each line card has a single Ethernet (registered trademark) port. In the subject exemplary embodiment, explanation on the processing of forwarding a frame using the FDBs 101 (111) is dispensed with.

The line card(s) 100 (110) is made up of an FDB(s) 101 (111), an FDB search unit(s) 103 (113) and an FDB learning unit(s) 102 (112).

Figure 2:
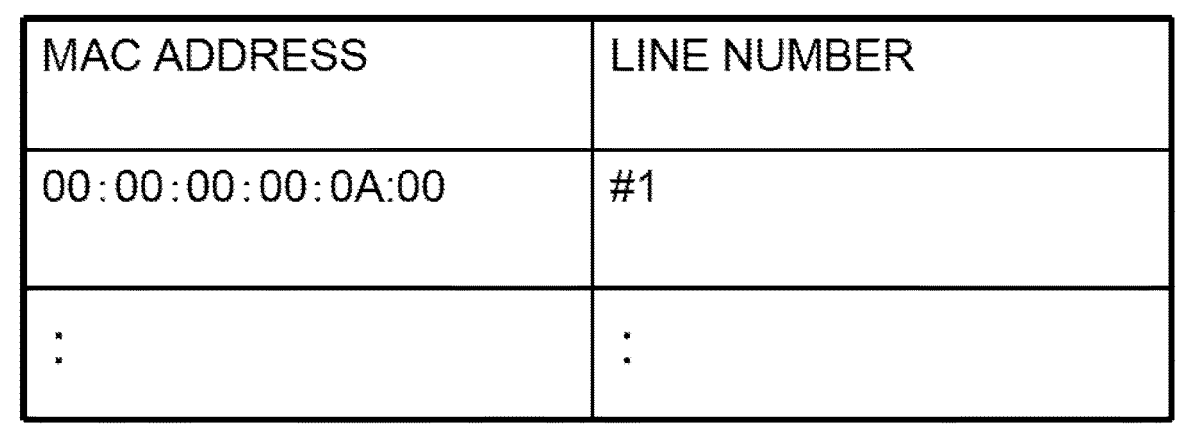

The FDB(s) 101 (111) is a database in which to store the information necessary to forward an Ethernet frame. For example, the FDB(s) 101 (111) may be implemented by a table in which zero-number or a plural number of sets, each set being made up of a MAC address and a line number, is stored, as shown for example in FIG. 2. It is noted that, in case the line card(s) 100 (110) includes a plurality of ports, each entry of the FDB(s) 101 (111) is associated with a unique port number.

On receipt of an inquiry from the search unit(s) 103 (113), the FDB(s) 101 (111) searches for a relevant entry, using the MAC address, for example, as a key, and sends the result searched to the FDB search unit(s) 103 (113). Also, the FDB(s) 101 (111) accepts registration of the FDB learning information from the FDB learning unit(s) 102 (112).

The FDB learning unit(s) 102 (112) is connected to the FDB(s) 101 (111) and to the FDB learning arbitration unit 202 of the switch card 200. On receipt of the FDB learning information from the FDB learning arbitration unit 202 of the switch card 200, the FDB learning unit(s) 102 (112) registers the FDB learning information in the FDB(s) 101 (111).

Also, the FDB learning unit(s) 102 (112) transmits to the FDB learning arbitration unit 202 of the switch card 200 a 'backpressure' as the information indicating whether or not the line card of interest is in an FDB learning enabled state. The 'backpressure' may be such information that assumes a first value (High) when an access interface to the FDB(s) 101 (111) is in a busy state, while assuming a second value (Low) when the access interface is not so. In place of the 'backpressure', the current load state, for example, may be transmitted to the FDB learning arbitration unit 202 of the switch card 200 as the information indicating whether or not the line card of interest is in the FDB learning enabled state. For example, such a mode may be adopted in which such a packet indicating outbreak of the CPU congested state is transmitted in case the CPU use ratio exceeds 90% and in which another packet indicating the cessation of the CPU congested state is transmitted in case the CPU use ratio falls to below 90%.

The FDB search unit(s) 103 (113) is connected to outside, to the FDB(s) 101 (111) and to the FDB learning arbitration unit 202 of the switch card 200. On receipt of a frame from outside, the FDB search unit(s) 103 (113) prepares the FDB learning information (MAC address of the source and the line number) and the search information (MAC address of the frame received) from the frame received and the line of receipt. The FDB search unit(s) then inquires at the FDB(s) 101 (111) about the entry corresponding to the search information.

If, as a result of the above inquiry, no relevant entry is found in the FDB(s) 101 (111), or the relevant entry, if found, is not consistent with the FDB learning information, the FDB search unit(s) 103 (113) concludes that FDB learning is necessary, and sends the FDB learning information to the FDB learning arbitration unit 202 of the switch card 200. If conversely the above inquiry has led to the result that there exists the relevant entry in the FDB 101 (111) and such relevant entry coincides with the FDB learning information, the FDB search unit(s) 103 (113) concludes that the FDB learning is unnecessary and refrains from doing anything.

The switch card includes a learning information buffer 201 in addition to the FDB learning arbitration unit 202.

The FDB learning arbitration unit 202 is connected to the learning information buffer 201 and to the FDB search unit(s) 103 (113) as well as FDB learning unit(s) 102 (112) of the line card(s) 100 (110). On receipt of the FDB learning information from the FDB search unit(s) 103 (113), the FDB learning arbitration unit 202 stores the information received in the learning information buffer 201. Moreover, if the FDB learning arbitration unit 202 is not receiving the 'backpressure' from any of the FDB learning units 102, 112, the FDB learning arbitration unit 202 sends the FDB learning information, taken out from the learning information buffer 201, to all of the line cards 100, 110. It is noted that the reference of selection of the FDB learning information to be taken out in case a plurality of FDB learning information entries are held in store in the learning information buffer 201 may be arbitrarily set. On the other hand, if the 'backpressure (signal)' is being received from a certain one(s) of the FDB learning units 102, 112, the FDB learning arbitration unit 202 refrains from sending out the FDB learning information.

In case the FDB learning arbitration unit 202 is to decide whether or not the 'backpressure' is being received from the total of the FDB learning units 102, 112, the logical sum or the logical product of signals transmitted from the line cards 100, 110 may be used. These signals may for example indicate a learning enabled state or a learning disabled state if they are High or Low, respectively. Doing so may enable grasping of the states of the total of the line cards.

The learning information buffer 201 holds in store the FDB learning information transmitted from the FDB learning arbitration unit 202. The FDB learning arbitration unit 202 may delete the FDB learning information read out from the learning information buffet 201.

It is noted that various parts (processing means) of the line card(s) or the switch card, shown in FIG. 1, may be implemented by a computer program that causes a computer provided on board the line card(s) or the switch card to execute the above mentioned processing using the computer's hardware.

The operation of the subject exemplary embodiment will now be described in detail with reference to the drawings. In a switching system according to the subject exemplary embodiment, four tasks are being carried out in parallel. The operation will now be explained using flowcharts illustrating the respective processing tasks.

(1) FDB Search Processing

Figure 3:
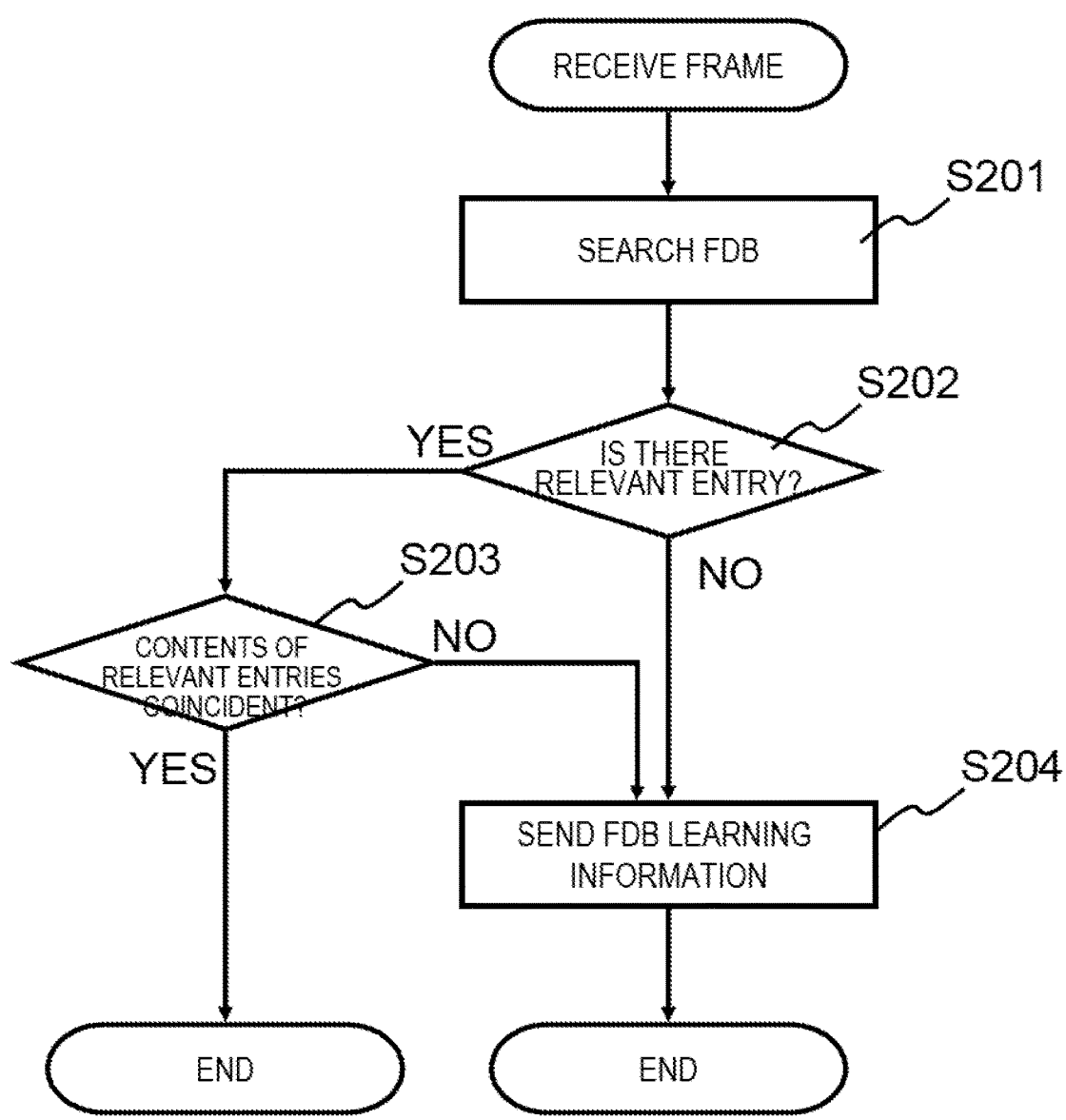
FIG. 3 is a flowchart showing the operation of a line card of the first exemplary embodiment of the present disclosure at the time of receiving a frame.

FIG. 3 depicts a flowchart showing the flow of the FDB search processing carried out at the time of frame reception by the line card(s) 100 (110) of the first exemplary embodiment of the present disclosure.

Referring to FIG. 3, when the FDB search unit(s) 103 (113) has received a frame from outside, the line card(s) 100 (110) prepares the FDB learning information and the search information from the frame received and the line of receipt. The FDB search unit(s) 103 (113) inquires at the FDB(s) 101 (111) about the presence/absence of the relevant entry, using the search information as the key. The FDB(s) 101 (111) searches the table or the like, shown for example in FIG. 2, and returns the result of the search to the FDB search unit(s) 103 (113) (step S201).

If, as a result of the search, no entry corresponding to the relevant MAC address has been registered in the FDB 101 (111) (No of a step S202), the FDB search unit(s) 103 (113) sends the FDB learning information to the FDB learning arbitration unit 202 of the switch card 200 (step S204) to terminate the processing.

If the entry corresponding to the relevant MAC address has been registered in the FDB(s) 101 (111) (Yes of the step S202), the FDB search unit(s) 103 (113) compares the entry, returned as response from the FDB(s) 101 (111), and the FDB learning information (source MAC address of the received frame and the line number), to each other (step S203).

If, as a result of the comparison, the two are coincident with each other (Yes of the step S203), the FDB search unit(s) 103 (113) terminates the processing without doing anything.

If, as a result of the comparison, the two are not coincident with each other (No of the step S203), the FDB search unit(s) 103 (113) transmits the FDB learning information to the FDB learning arbitration unit 202 of the switch card 200 (step S204) to terminate the processing.

As described above, each time a frame is delivered to the line card(s), it is determined whether or not it is necessary to carry out FDB learning. If it is necessary to carry out the FDB learning, the FDB learning information is sent to the FDB learning arbitration unit 202 of the switch card 200.

(2) Processing of Storing the FDB Learning Information

Figure 4:
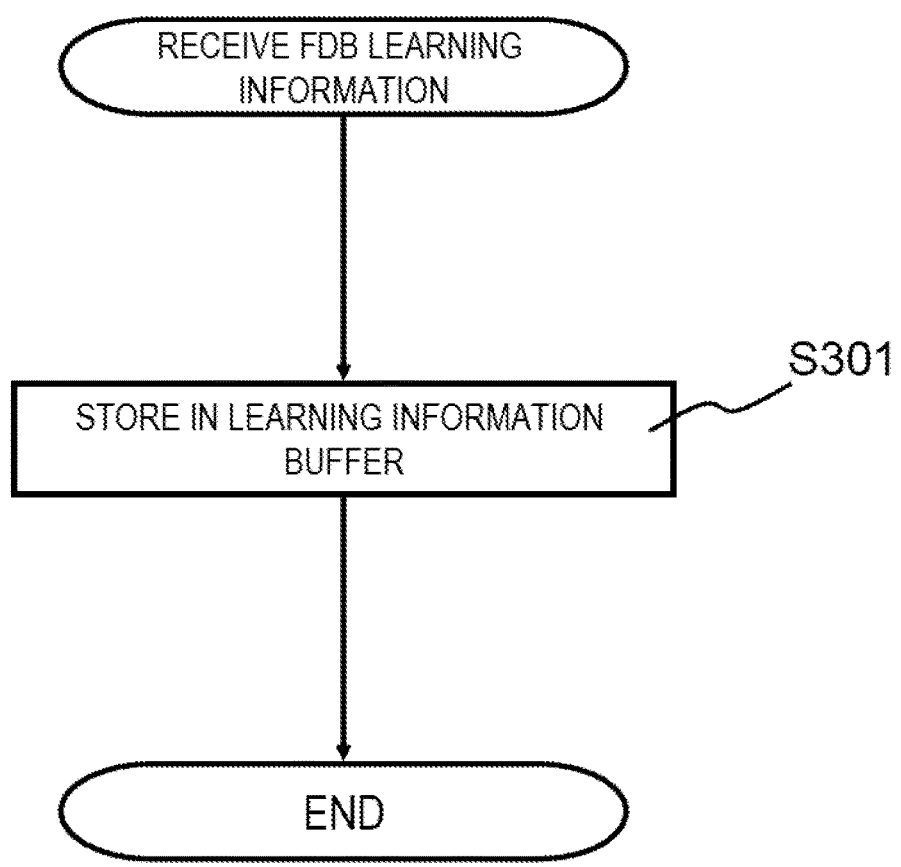
FIG. 4 is a flowchart showing the operation of a switch card the first exemplary embodiment of the present disclosure at the time of receiving the FDB learning information.

FIG. 4 depicts flowchart showing the flow of storage processing varied out at the time of receiving the FDB learning information by the switch card 200 of the first exemplary embodiment of the present disclosure.

Referring to FIG. 4, on receipt of the FDB learning information from the FDB search unit(s) 103 (113) of the line card(s) 100 (110), the FDB learning arbitration unit 202 of the switch card 200 causes the FDB learning information to be stored in the learning information buffer 201 (step S301) to terminate the processing. It is noted that the storage location of the FDB learning information in the learning information buffer 201 is determined in accordance with a preset rule. In the subject exemplary embodiment any new FDB learning information is stored at the trailing end of the learning information buffer 201.

(3) Processing of Arbitration of FDB Learning

Figure 5:
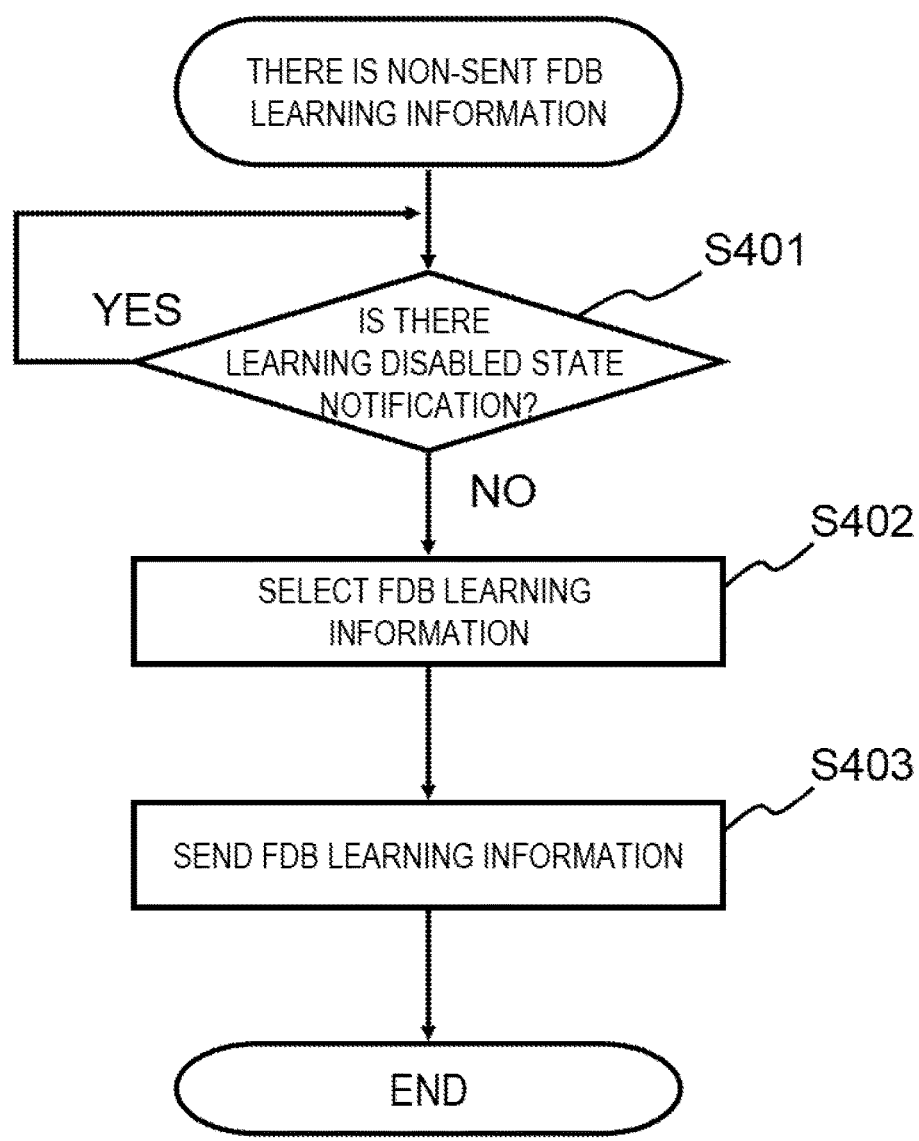
FIG. 5 is a flowchart showing the operation of the switch card of the first exemplary embodiment of the present disclosure at the time of sending the FDB learning information.

FIG. 5 depicts a flowchart showing the flow of the processing of transmitting the FDB learning information (arbitration processing) of the switch card 200 of the subject exemplary embodiment. It is noted that the 'arbitration processing' denotes the processing of sending the FDB learning information to the FDB learning unit(s) 102 (112) at a timing when FDB learning can be carried out most reliably.

The flow of arbitration processing of FIG. 5 is initiated when not less than one item of the FDB learning information has been stored in the learning information buffer 201, and is continued subsequently until the contents of the learning information buffer 201 are empty.

Referring to FIG. 5, when it is confirmed that one or more of the FDB learning information items has been stored in the learning information buffer 201, the FDB learning arbitration unit 202 of the switch card 200 determines whether or not the 'backpressure' is being received from the FDB learning units 102 (112) of each line card (step S401). If the 'backpressure' is being received from at least one line card, the FDB learning arbitration unit 202 defers any subsequent processing of sending the FDB learning information (processing reverts to the step S401).

If 'backpressure' is being received from none of the line cards, the FDB learning arbitration unit 202 takes out the FDB learning information at the foremost row in the learning information buffer 201 (step S402).

The learning arbitration unit 202 sends the FDB learning information, taken out as described above, to the FDB learning units 102 (112) of the total of the line cards 100 (110) connected thereto (step S403) to terminate the processing. It is noted that, after the steps S402 or the step S403 is finished, the FDB learning information, thus sent out, is deleted from the learning information buffer 201.

(4) Processing of FDB Learning

Figure 6:
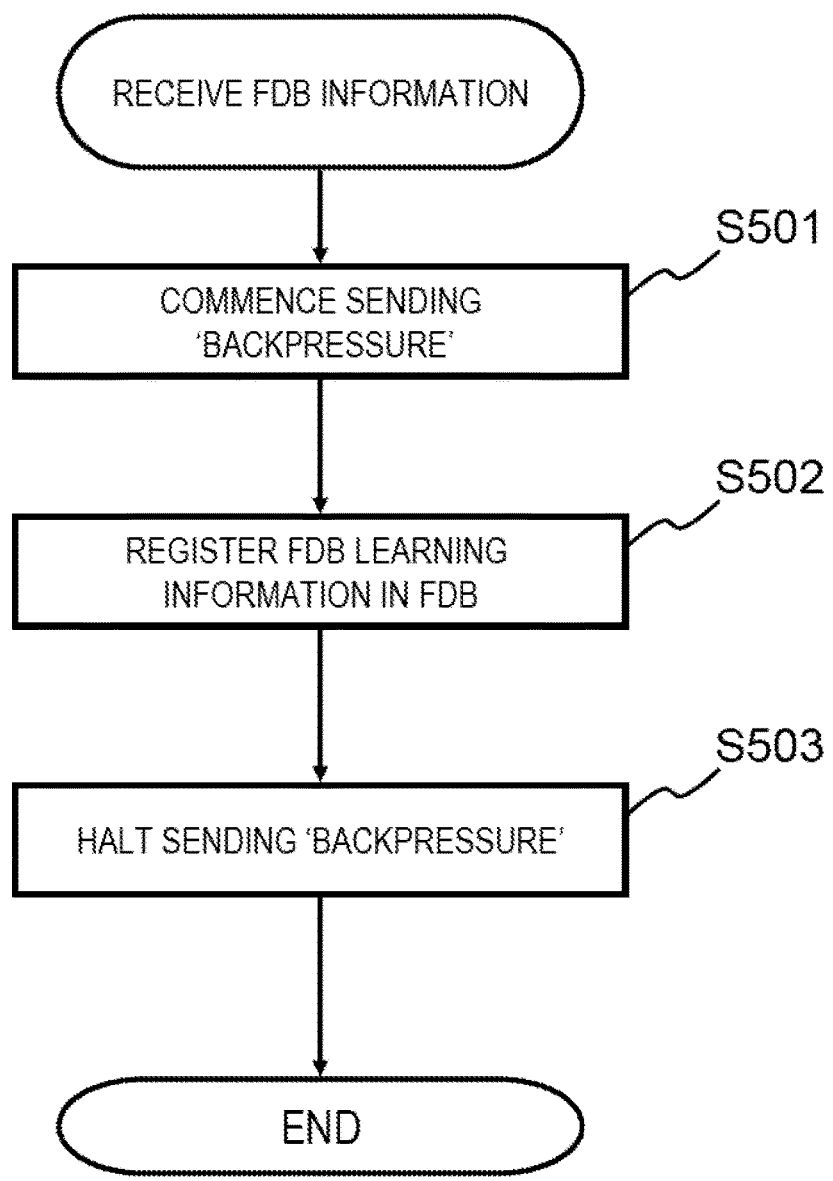
FIG. 6 is a flowchart showing the operation of the line card of the first exemplary embodiment of the present disclosure at the time of receiving the FDB learning information.

FIG. 6 depicts a flowchart showing the operation at the time of receiving the FDB learning information of the line card(s) 100 (110) of the subject exemplary embodiment. Referring to FIG. 6, on receipt of the FDB learning information from the FDB learning arbitration unit 202 of the switch card 200, the FDB learning unit(s) 102 (112) of the line card(s) 100 (110) commences sending the 'backpressure' to the FDB learning arbitration unit 202 of the switch card 200 (step S501). It is noted that the 'backpressure' continues to be transmitted until registration in the FDB(s) 101 (111) is completed.

The FDB learning unit(s) 102 (112) registers, in a step S502, the FDB learning information in the FDBs 101 (111) in the same line card (own device).

When the registration of the FDB learning information is completed, sending the 'backpressure' from the FDB learning unit(s) 102 (112) to the FDB learning arbitration unit 202 ceases (step S503).

As described above, in the subject exemplary embodiment, it is determined, based on the 'backpressure' sent from the FDB learning unit(S) 102 (112), whether the total of the line cards is in the FDB learning enabled state. Thus, if the total of the line cards is in the FDB learning enabled state, learning processing may be carried out positively, so that resources may be exploited sufficiently to ensure the fast FDB learning.

Second Exemplary Embodiment

Figure 7:
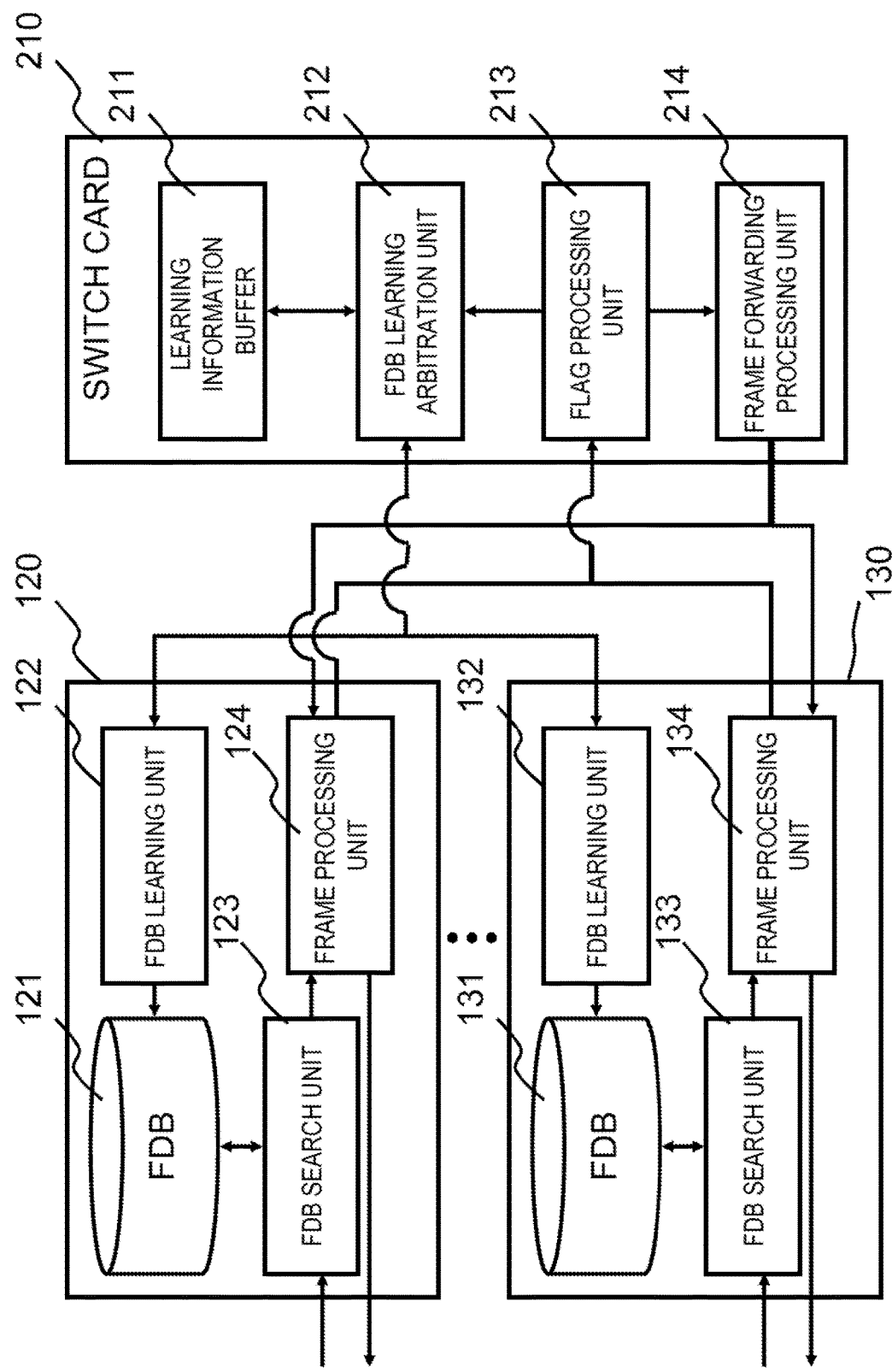
FIG. 7 is a schematic view showing a configuration of second exemplary embodiment of the present disclosure.

A second exemplary embodiment of the present disclosure, in which exchanging the FDB learning information or the like between the line card(s) and the switch card is carried out on the same route as that for the frame, will now be explained. FIG. 7 shows the configuration of a switching system according to the second exemplary embodiment of the present disclosure.

The subject exemplary embodiment differs from the first exemplary embodiment in the following two points. The first point of difference is that a frame processing unit(s) 124 (134), configured for exchanging a frame of a unique format (see FIG. 8; referred to below as a 'dedicated frame') with a switch card 210 and for processing the frame, is provided on a line card(s) 120 (130) side. The second point is that a flag processing unit 213, configured for processing a flag contained in the dedicated frame sent from the frame processing unit(s) 124 (134) and a frame forwarding processing unit 214, configured for forwarding the dedicated frame to the line card(s) 120 (130), are provided on the switch card 210 side. In the following explanation, it is assumed that, as in the first exemplary embodiment, four line cards are connected to the single switch card, there being single Ethernet port for the single line card. The following explanation is centered about the points of difference from the first exemplary embodiment.

In the subject exemplary embodiment, an FDB search unit(s) 123 (133) of the line cards 120 (130) sends all three of a frame received from outside, the FDB learning information and a flag to the frame processing unit(s). In the flag, binary values indicating the necessity or the non-necessity of FDB learning are set. Thus, if it is decided that the FDB learning is necessary, the value "1" is set and, if otherwise, the value "0" is set. It is noted that the FDB search unit(s)

123 (133) of the line cards 120 (130) of the subject exemplary embodiment only receives, without sending a frame to outside.

Figure 8:
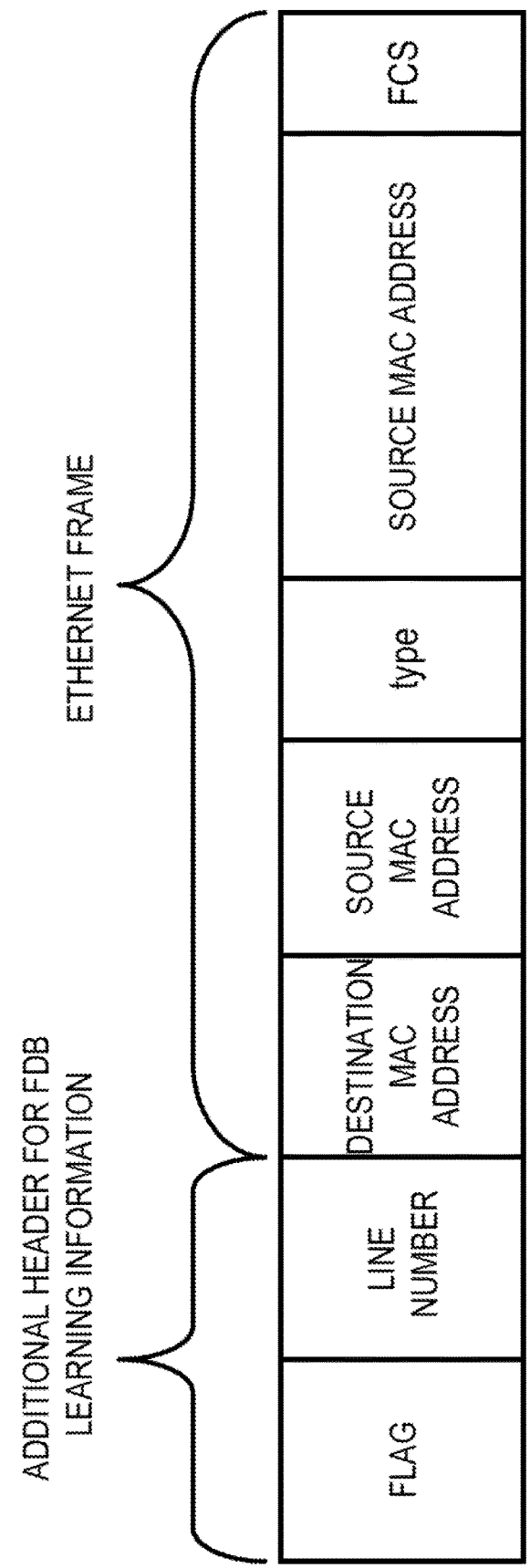
FIG. 8 is a tabulated view showing a configuration of a dedicated frame used in the second exemplary embodiment of the present disclosure.

On receipt of the FDB learning information, frame and the flag from the FDB search unit(s) 123 (133), the frame processing unit(s) 124 (134) prepares the dedicated frame composed of an Ethernet frame and an additional header containing the flag and the FDB learning information (line number) (see FIG. 8). The frame processing unit(s) sends the so prepared dedicated frame to the flag processing unit 213 of the switch card 210. On receipt of the dedicated frame from the frame forwarding processing unit 214 of the switch card 210, the frame processing unit(s) 124 (134) deletes the FDB learning information and the flag from the dedicated frame to send the resulting frame to outside.

An FDB(s) 121 (131) and an FDB learning unit(s) 122 (132) of the line card(s) 120 (130) are equivalent to the FDB(s) 101 (111) and the FDB learning unit(s) 102 (112) of the first exemplary embodiment, respectively, and hence the corresponding explanation therefor is dispensed with.

An FDB learning arbitration unit 212 of the switch card 210 of the subject exemplary embodiment does not receive the FDB learning information directly from the line card(s) 120 (130), but from the flag processing unit 213. Otherwise, the operation on receipt of the FDB learning information is the same as that of the first exemplary embodiment.

On receipt of the dedicated frame from the frame processing unit(s) 124 (134) of the line card(s) 120 (130), the flag processing unit 213 checks the in the dedicated frame to make a decision on the processing to be performed next. If the flag is 1, indicating the necessity for learning, the flag processing unit 213 extracts the FDB learning information (sending source MAC address and the line number) from the dedicated frame, and sends the FDB learning information to the FDB learning arbitration unit 212, while sending the dedicated frame to the frame forwarding processing unit 214. If conversely the flag is 0, indicating the non-necessity for learning, the flag processing unit 213 sends the dedicated frame to the frame forwarding processing unit 214.

On receipt of the dedicated frame from the flag processing unit 213, the frame forwarding processing unit 214 checks the flag in the dedicated frame to make a decision as to the processing to be performed next. If the flag is 1, indicating the necessity for learning, the frame forwarding processing unit 214 sends the dedicated frame to the frame processing unit of the line card, corresponding to the line card number within the dedicated frame. If conversely the flag is 0, testifying to the non-necessity for learning, the frame forwarding processing unit 214 sends the dedicated frame to the frame forwarding processing units 124 (134) of the total of the line cards.

Otherwise, a learning information buffer 211 is equivalent to the learning information buffer 201 of the first exemplary embodiment, and hence the corresponding explanation is dispensed with.

The operation of the subject exemplary embodiment will now be detailed with reference to the drawings. In the switching system of the subject exemplary embodiment, five tasks are in operation in parallel. The operation will be explained below using respective flowcharts for these processing tasks.

(1A) FDB Search Processing

Figure 9:
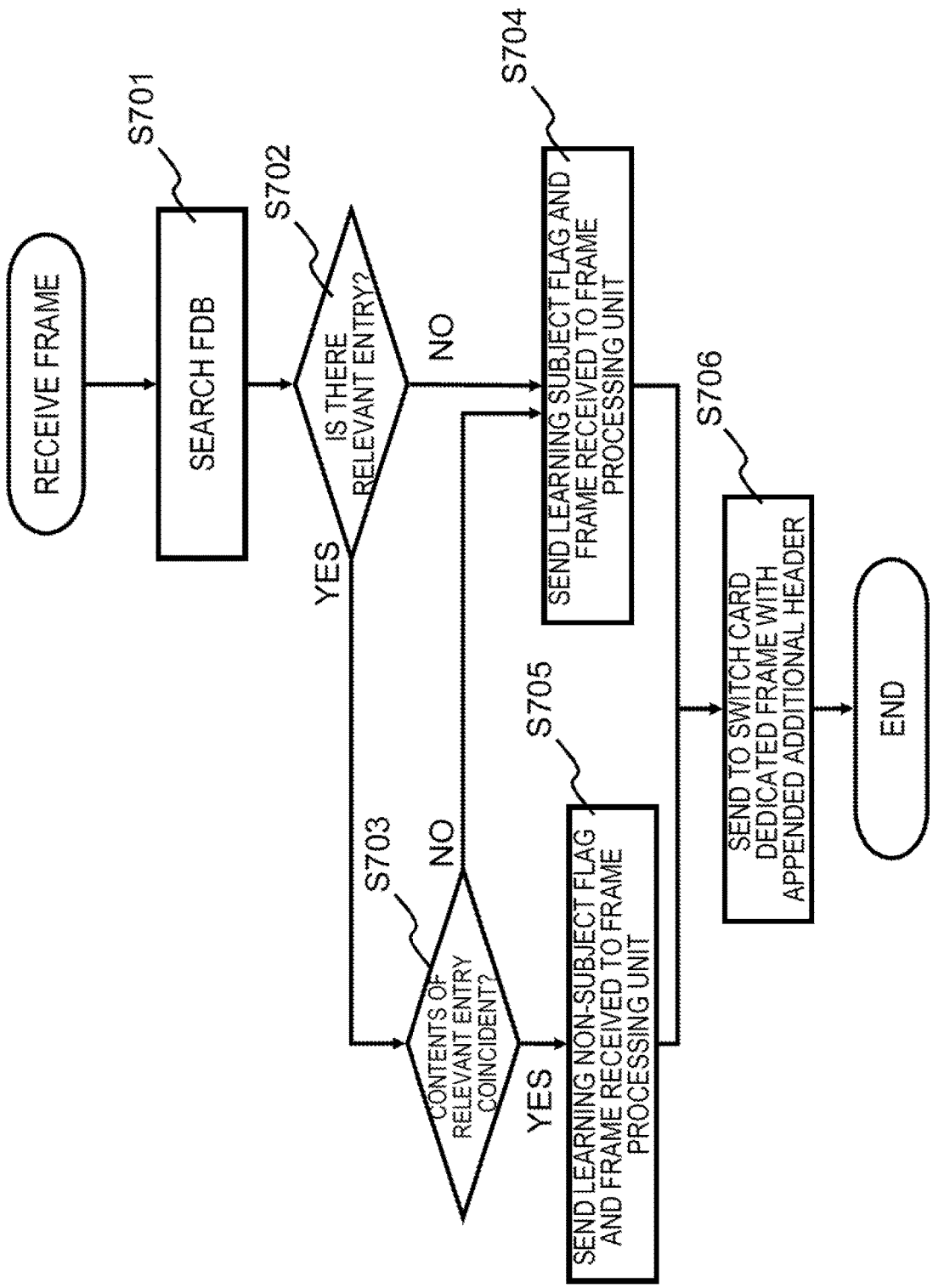
FIG. 9 is a flowchart showing the operation of a line card of the second exemplary embodiment of the present disclosure at the time of receiving the frame.

FIG. 9 depicts a flowchart showing the flow of FDB search processing carried out at the time of frame reception by the line card(s) 120 (130) according to the second exemplary embodiment of the present disclosure.

Referring to FIG. 9, in case the FDB search unit(s) 123 (133) of the line card(s) 120 (130) has received a frame from outside, the line card(s) prepares the FDB learning information and the search information from the frame received and the line of receipt. The FDB search unit(s) 123 (133) inquires the FDB(s) 121 (131) about the presence/absence of the relevant entry, using the search information as the key. The FDB(s) 121 (131) searches a table, such as one shown in FIG. 2 and returns the search result as response to the FDB search unit(s) 123 (133) (step S701).

If, as a result of the search, the entry corresponding to the relevant MAC address has not been registered in the FDB(s) 121 (131) (No of a step S702), the FDB search unit(s) 123 (133) sends the flag (1 indicating the necessity for learning), the FDB learning information and the frame received to the frame processing unit(s) 124 (134) (step S704).

If conversely the entry corresponding to the relevant MAC address has not been registered in the FDB(s) 121 (131) (Yes of a step S702), the FDB search unit(s) 123 (133) compares the entry returned as response from the FDB(s) 121 (131) and the FDB learning information (source MAC address of the frame received and the line number to each other (step S703).

If as a result of the comparison, the two are coincident to each other (Yes of the step S703), the FDB search unit(s) 123 (133) sends the flag (0 indicating the non-necessity for learning), the FDB learning information and the frame received to the frame processing unit(s) 124 (134) (step S705).

If, as a result of the comparison, the two are not coincident to each other (No of the step S703), the FDB search unit(s) 123 (133) sends the flag (1 indicating the necessity for learning), the FDB learning information and the frame received to the frame processing unit(s) 124 (134) (step S704).

Finally, using the flag and the FDB learning information, received from the FDB search unit(s) 123 (133), and the frame received, the frame processing unit(s) 124 (134) prepares a dedicated frame by appending the additional header, shown in FIG. 8, to the frame received. The frame processing unit(s) sends the so prepared dedicated frame to the flag processing unit 213 of the switch card 210.

As described above, each time a frame is supplied to the line card(s), it is determined whether or not the FDB learning is to be performed. The dedicated frame, containing the flag, showing the result of the check, and the line information, is sent to the switch card 210.

Figure 10:
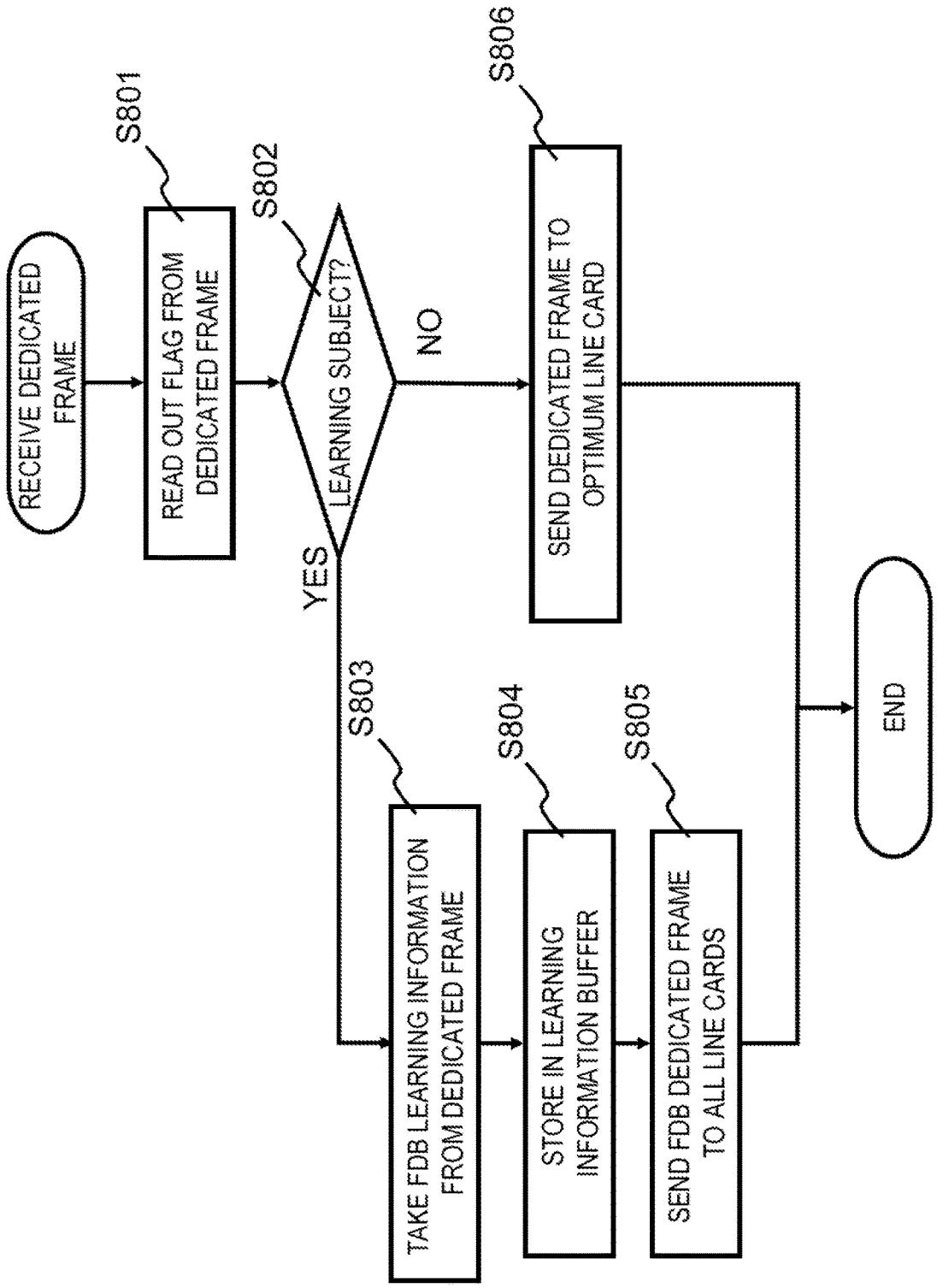
FIG. 10 is a flowchart showing the operation of the switch card of the second exemplary embodiment of the present disclosure at the time of receiving the dedicated frame.

Processing of Storing FDB Learning Information FIG. 10 depicts a flowchart showing the flow of processing carried out in the switch card 210 of the second exemplary embodiment of the present disclosure at the time of receipt of the dedicated frame.

Referring to FIG. 10, on receipt of the dedicated frame, the flag processing unit 213 of the switch card 210 checks the flag in the dedicated frame (step S801).

If the flag has the value of "1", indicating the necessity for learning, the flag processing unit 213 extracts the FDB learning information (source MAC address and the line number) from the dedicated frame, and sends the FDB learning information to the FDB learning arbitration unit 212 (step S803).

On receipt of the FDB learning information, the FDB learning arbitration unit 212 causes the FDB learning information received to be stored in the learning information buffer 211 (step S804).

On the other hand, the flag processing unit 213 of the switch card 210 sends the dedicated frame to the frame forwarding processing unit 214 to cause the frame forwarding processing unit to forward the dedicated frame to the total of the line cards (step S805).

If conversely the flag has a value of "0", in the step S802, testifying to the non-necessity of learning, the flag processing unit 213 references the line number in the dedicated frame, and sends the dedicated frame to the relevant line card (step S806).

(3A) Arbitration Processing of FDB Learning
(4A) FDB Learning Processing

The arbitration processing for the FDB learning (3A) and the FDB learning processing (4A) in the subject exemplary embodiment are similar to those in the first exemplary embodiment and hence the explanation therefor is dispensed with (see FIGS. 5, 6).

(5A) Frame Processing

Figure 11:
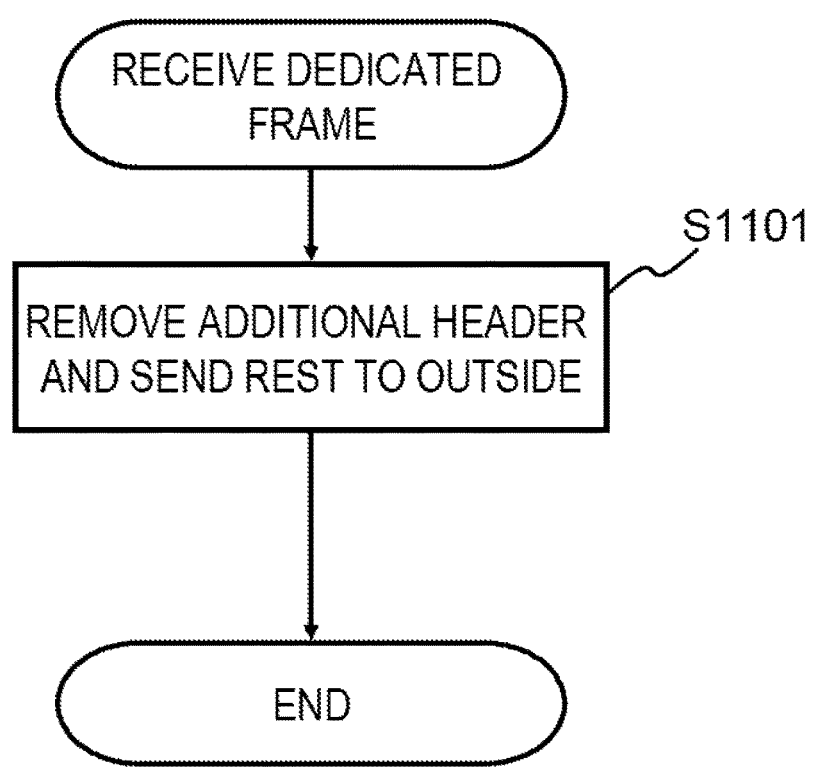
FIG. 11 is a flowchart showing the operation of the line card of the second exemplary embodiment of the present disclosure at the time of receiving the dedicated frame.

FIG. 11 depicts a flowchart showing the flow of processing at the time of receiving the dedicated frame by the line car(s) 120 (130) of the second exemplary embodiment of the present disclosure.

When the dedicated frame, sent at the steps S805, S806 of FIG. 10, is delivered to the frame processing unit(s) 124 (134) of the line card(s) 120 (130), the frame processing unit(s) 124 (134) deletes the additional header, containing the information concerning the flag and the line number, from the dedicated frame received, as shown in FIG. 11. This restores the dedicated frame to the ordinary Ethernet frame, which is then forwarded to outside (step S1101).

With the subject exemplary embodiment, the following advantageous effect may be obtained in addition to that achieved with the first exemplary embodiment described above. In the switching system, on which a plurality of line cards may be provided on board, the line cards and the switch card are usually interconnected by a connector in order to enable the line cards to be exchanged for new ones. Since the number of pins for connection, provided on the connector, is limited, it becomes necessary to increase the number of the connectors if the number of signals to be transmitted between the switch card and the line cards exceeds the prescribed number of connector pins.

However, if the number of the connectors is increased, the packaging space on a substrate has to be increased with consequent rise in the costs of the connector components. A designer thus has to make time-consuming designing efforts to exchange a lot of information using a smaller number of connectors (signals).

In the above described first exemplary embodiment, the frame and the learning information are sent over respective different paths. It is specifically presupposed to provide a physical signal line for the FDB learning information different from the frame communication route. However, in the second exemplary embodiment, in which the dedicated frame is a used, the FDB learning information can be sent on the same signal path as the path used for frame communication. Since there is no necessity to provide the separate physical signal line, it becomes possible to decrease the number of signal lines, thus assuring facilitated designing.

It should be noted that, while preferred exemplary embodiments of the present invention are described above, the present invention is not to be restricted to these particular modes, such that further changes, substitutions or adjustments may be made within the range not departing from the basic technical concept of the invention. For example, there is no limitation to the number of line cards or ports used in the above described exemplary embodiments.

Moreover, in the above described exemplary embodiments, the 'backpressure' is used in order for the line card(s) to indicate to the switch card whether or not the line card(s) is in the FDB learning enabled state. It is however also possible use any other suitable signal to indicate whether or not the line card(s) is in the FDB learning enabled state. Of course, not the FDB learning unit but any other suitable processing means may be used to indicate whether the line card(s) is in the FDB learning enabled state.

Finally, certain desirable modes of the present invention will be summarized.

[Mode 1]
(See the switching system according to the above mentioned first aspect).

[Mode 2]
The switching system according to mode 1, wherein,
as long as the FDB learning information is being written in the FDB(s), the line card(s) notifies to the switch card that the line card(s) is not in the FDB learning enabled state.

[Mode 3]
The switching system according to mode 1 or 2, wherein,
the line card(s) notifies whether or not it is in FDB learning enabled state depending on whether or not a numerical value representing a load state of the own device has exceeded a preset threshold value.

[Mode 4]
The switching system according to an one of modes 1 to 3, wherein,
the line card(s) includes a frame processing unit that causes the information being sent to the switch card to be stored in a preset frame; and wherein,
the switch card takes out the FDB learning information from the frame based on a flag contained in the frame; the switch card registering the FDB learning information thus taken out in the learning information storage unit.

[Mode 5]
The switching system according to mode 4, wherein,
the frame received and the FDB learning information are sent on the same physical line using the preset frame.

[Mode 6]
The switching system according to any one of modes 1 to 5, wherein,
the switch card commences sending the FDB learning information to the switch card based on a logical sum or a logical product of signals received from each line card; the signals indicating whether or not each line card is in an FDB learning enabled state.

[Mode 7]
(See the line card according to the above mentioned second aspect)

[Mode 8]
(See the switch card according to the above mentioned third aspect)

[Mode 9]
(See the method for FDB learning according to the above mentioned fourth aspect)

[Mode 10]
(See the method for arbitrating FDB learning according to the above mentioned fifth aspect)

[Mode 11]
A program that causes a computer provided on board a line card(s) connected to a switch card including a learning information storage unit that holds in store the FDB learning information received from the line card(s) and an FDB learning arbitration unit that sends the FDB learning information stored to the line card(s) if, based on a notification from the line card(s), the total of the line cards are in the FDB learning enabled state, to perform the processing of;

searching an FDB (forwarding database) for an entry matched to a frame received to decide whether or not FDB learning is necessary;

sending the FDB learning information to the switch card in case it has been decided that the FDB learning is necessary; and registering the FDB information sent from the switch card in the FDB in case the total of the line cards are in the FDB learning enabled state.

[Mode 12]

A program that causes a computer provided on board a switch card connected to a plurality of line cards each including an FDB search unit and an FDB learning unit; the FDB search unit searching an FDB (forwarding database) for an entry matched to a frame received to make a decision on whether or not FDB learning is necessary; the FDB search unit sending the FDB learning information to the switch card in case the decision is made that FDB learning necessary; the FDB learning unit registering the FDB learning information received from the switch card in the FDB; the line card(s) notifying the switch card about whether or not the line card(s) is in the FDB learning enabled stare; to perform the processing of holding on store the FDB learning information received from the line card(s); and sending the FDB learning information stored to each line card if, based on a notification from the line card(s), the total of the line cards are in the FDB learning enabled state.

The disclosures of the abovementioned Patent Literatures are to be incorporated herein by reference. The particular exemplary embodiments or examples may be changed or adjusted within the gamut of the entire disclosure of the present invention, inclusive of claims and drawings, based on the fundamental technical concept of the invention. Moreover, a variety of combinations or selection of elements herein disclosed (elements of claims, modes, Examples and drawings) may be made within the concept of the claims of the present invention. Viz., it goes without saying that the present invention may include a variety of changes or corrections that may occur to those skilled in the art in accordance with the total disclosures inclusive of the claims and the drawings as well as the technical concept of the invention.

100, 110, 120, 130 line cards
101, 111, 121, 131 FDBs
102, 112, 122, 132 FDB learning units
103, 113, 123, 133 FDB search units
124, 134 frame processing units
200, 210 switch cards
201, 211 learning information buffers
202, 212 FDB learning arbitration units
213 flag processing unit
214 frame forwarding processing unit

What is claimed is:

1. A switching system, comprising:
a plurality of line cards each including an FDB (forwarding database), an FDB search unit and an FDB learning unit; the FDB search unit searching the FDB for an entry matched to a frame received to make a decision on whether or not FDB learning is necessary; the FDB search unit sending FDB learning information to a switch card in case the decision is made that FDB learning is necessary; the FDB learning unit registering the FDB learning information received from the switch card in the FDB; the line card(s) notifying the switch card about whether or not the line card(s) is in the FDB learning enabled state; and the switch card; the switch card including a learning information storage unit that holds in store the FDB learning information received from the plurality of the line cards, and an FDB learning arbitration unit; the FDB learning arbitration unit selectively sending the FDB learning information stored in the learning information storage unit to the line cards if, based on a notification from each of the line cards, the total of the line cards are in the FDB learning enabled state, wherein the switch card commences sending the FDB learning information to the switch card based on a logical sum or a logical product of signals received from each line card; the signals indicating whether or not each line card is in an FDB leaning enabled state.

2. The switching system according to claim 1, wherein, as long as the FDB learning information is being written in the FDB(s), the line card(s) notifies the switch card that the line card(s) is not in the FDB learning enabled state.

3. The switching system according to claim 2, wherein, the line card(s) notifies whether or not it is in an FDB learning enabled state depending on whether or not a numerical value representing a load state of the own device has exceeded a preset threshold value.

4. The switching system according to claim 2, wherein, the line card(s) includes a frame processing unit that causes the information being sent to the switch card to be stored in a preset frame; and wherein,
the switch card takes out the FDB learning information from the frame based on a flag contained in the frame; the switch card registering the FDB learning information thus taken out in the learning information storage unit.

5. The switching system according to claim 4, wherein, the frame received and the FDB learning information are sent on the same physical line using the preset frame.

6. The switching system according to claim 1, wherein, the line card(s) notifies whether or not it is in an FDB learning enabled state depending on whether or not a numerical value representing a load state of the own device has exceeded a preset threshold value.

7. The switching system according to claim 6, wherein, the line card(s) includes a frame processing unit that causes the information being sent to the switch card to be stored in a preset frame; and wherein,
the switch card takes out the FDB learning information from the frame based on a flag contained in the frame; the switch card registering the FDB learning information thus taken out in the learning information storage unit.

8. The switching system according to claim 7, wherein, the frame received and the FDB learning information are sent on the same physical line using the preset frame.

9. The switching system according to claim 1, wherein, the line card(s) includes a frame processing unit that causes the information being sent to the switch card to be stored in a preset frame; and wherein,
the switch card takes out the FDB learning information from the frame based on a flag contained in the frame; the switch card registering the FDB learning information thus taken out in the learning information storage unit.

10. The switching system according to claim 9, wherein, the frame received and the FDB learning information are sent on the same physical line using the preset frame.

11. A line card(s), connected to a switch card; the switch card including a learning information storage unit that holds in store FDB learning information received from the line card(s) and an FDB learning arbitration unit that sends the FDB learning information stored to the line card(s) if, based on a notification from each of the line cards, the total of the line cards are in the FDB learning enabled state;

the line card(s) including:

an FDB search unit that searches an FDB (forwarding database) for an entry matched to a frame received to make a decision on whether or not FDB learning is necessary; the FDB search unit sending the FDB learning information to the switch card in case the decision is made that FDB learning is necessary; and an FDB learning unit that registers the FDB learning information received from the switch card in the FDB; the line card(s) notifying the switch card about whether or not the line card(s) is in the FDB learning enabled state, wherein the switch card commences sending the FDB learning information to the switch card based on a logical sum or a logical product of signals received from each line card; the signals indicating whether or not each line card is in an FDB leaning enabled state.

12. A switch card, comprising:

a learning information storage unit that holds in store FDB (forwarding database) learning information received from a plurality of line cards and an FDB learning arbitration unit; the FDB learning arbitration unit sending the FDB learning information stored to each of the line cards if, based on a notification from each of the line cards, the total of the line cards are in the FDB learning enabled state, wherein the switch card commences sending the FDB learning information to the switch card based on a logical sum or a logical product of signals received from each line card; the signals indicating whether or not each line card is in an FDB leaning enabled state.

13. A method for learning FDB information comprising:

a line card(s) connected to a switch card; the switch card including a learning information storage unit that holds in store FDB learning information received from the line card(s) and an FDB learning arbitration unit; the FDB learning arbitration unit sending the FDB learning information stored to each of the line cards if, based on a notification from each of the line cards, the total of the line cards are in the FDB learning enabled state;

searching an FDB (forwarding database) for an entry matched to a frame received to make a decision on whether or not FDB learning is necessary;

sending the FDB learning information to the switch card in case the decision is made that FDB learning is necessary; and registering the FDB learning information received from the switch card in the FDB when the total of the line cards are in the FDB learning enabled state, wherein the switch card commences sending the FDB learning information to the switch card based on a logical sum or a logical product of signals received from each line card; the signals indicating whether or not each line card is in an FDB leaning enabled state.

14. A method for arbitrating FDB learning, comprising:

a switch card connected to a plurality of line cards each including an FDB search unit and an FDB learning unit; the FDB search unit searching an FDB (forwarding database) for an entry matched to a frame received to make a decision on whether or not FDB learning is necessary; the FDB search unit sending FDB learning information to the switch card in case the decision is made that FDB learning is necessary; the FDB learning unit registering the FDB learning information received from the switch card in the FDB; the line card(s) notifying the switch card about whether or not the line card(s) is in the FDB learning enabled state;

storing the FDB learning information received from the line card(s); and sending the FDB learning information stored to each of the line cards if, based on a notification from each of the line cards, the total of the line cards are in the FDB learning enabled state, wherein the switch card commences sending the FDB learning information to the switch card based on a logical sum or a logical product of signals received from each line card; the signals indicating whether or not each line card is in an FDB leaning enabled state.

* * * * *